(12) United States Patent
Knox et al.

(10) Patent No.: US 11,812,125 B2
(45) Date of Patent: Nov. 7, 2023

(54) ANTI-REFLECTIVE CAMERA HOUSING SYSTEM

(71) Applicant: Universal City Studios LLC, Universal City, CA (US)

(72) Inventors: Samuel Knox, Orlando, FL (US); Travis Barrett, Orlando, FL (US); Alexandre Lupien, Orlando, FL (US); Vassily Coste, Orlando, FL (US); Erik Neergaard, Orlando, FL (US); Maxime Doyle, Orlando, FL (US); Steven Beliveau, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 17/364,613

(22) Filed: Jun. 30, 2021

(65) Prior Publication Data

US 2022/0006926 A1    Jan. 6, 2022

Related U.S. Application Data

(60) Provisional application No. 63/047,095, filed on Jul. 1, 2020.

(51) Int. Cl.
*H04N 23/51* (2023.01)
*G03B 17/12* (2021.01)
(Continued)

(52) U.S. Cl.
CPC ............ *H04N 23/51* (2023.01); *G03B 17/02* (2013.01); *G03B 17/12* (2013.01); *G06T 7/20* (2013.01);
(Continued)

(58) Field of Classification Search
CPC ...... F16M 13/02–027; G08B 13/19617–19632
See application file for complete search history.

(56) References Cited

U.S. PATENT DOCUMENTS 4,739,567 A * 4/1988 Cardin .................... G09F 19/18
359/461
5,241,380 A * 8/1993 Benson ............ G08B 13/19623
348/82
(Continued)

FOREIGN PATENT DOCUMENTS

JP      2007025967 A  *  2/2007
KR      10-0896310 B1 *  5/2009  .............. G03B 15/06

OTHER PUBLICATIONS

Videosecu, Weatherproof Heavy Duty Aluminum Outdoor Enclosure Security Camera Housing Cable Through Bracket with Mounting Bracket for CCTV Surveillance Camera BQ1, Amazon, Jun. 26, 2008, 6 pgs., https://www.amazon.com/VideoSecu-Weatherproof-Aluminum-Enclosure-Surveillance/dp/B001BOLC1U.
(Continued)

*Primary Examiner* — Leon W Rhodes, Jr.
(74) *Attorney, Agent, or Firm* — Fletcher Yoder, P.C.

(57) ABSTRACT

Embodiments of the present disclosure relate to an amusement park attraction installation including a camera disposed on a side of a window, where the camera includes a lens and is configured to capture image data indicative of movement of a guest on an opposite side of the window. The amusement park attraction installation also includes a light source positioned on the side of the window and a camera housing disposed at least partially about the camera, where the camera housing has an inner volume and an opening surrounded by an edge of the camera housing, the lens is disposed within the inner volume, and the edge of the camera housing is in abutment with a surface of the window.

20 Claims, 6 Drawing Sheets

(51) Int. Cl.
*G06T 7/20* (2017.01)
*H04N 23/52* (2023.01)
*H04N 23/54* (2023.01)
*G03B 17/02* (2021.01)
*A63G 31/16* (2006.01)
*A63G 7/00* (2006.01)

(52) U.S. Cl.
CPC ............ H04N 23/52 (2023.01); H04N 23/54 (2023.01); *A63G 7/00* (2013.01); *A63G 31/16* (2013.01); *G06T 2207/30196* (2013.01)

(56) References Cited

U.S. PATENT DOCUMENTS

| | | | |
|---|---|---|---|
| 5,904,330 | A | 5/1999 | Manico et al. |
| 7,599,002 | B2 * | 10/2009 | Willes ................ F16M 13/027 348/375 |
| 8,469,613 | B2 * | 6/2013 | Sechrist ............... G03B 11/045 396/428 |
| 9,152,856 | B2 * | 10/2015 | Tsai ........................ G06V 10/34 |
| 9,615,007 | B2 * | 4/2017 | Pfaffinger, Jr. ....... H04N 5/2252 |
| 9,805,595 | B1 * | 10/2017 | Liebinger Portela .. G08G 1/012 |
| 9,819,863 | B2 | 11/2017 | Osborne et al. |
| 9,857,575 | B2 | 1/2018 | Nunnink et al. |
| 10,048,570 | B1 | 8/2018 | Gartrell et al. |
| 10,134,267 | B2 * | 11/2018 | Kawash ................ A63H 30/04 |
| 10,239,469 | B2 * | 3/2019 | Ghannam ............... B60R 11/04 |
| 10,498,936 | B2 * | 12/2019 | Ehrenkranz ............. B01L 9/527 |
| 11,445,093 | B2 * | 9/2022 | Takeshige .......... H04N 5/22521 |
| 2008/0031607 | A1 | 2/2008 | Liao |
| 2015/0336013 | A1 | 11/2015 | Stenzler et al. |
| 2018/0052308 | A1 | 2/2018 | Kong et al. |

OTHER PUBLICATIONS

Bosch, LTC 9303 Series Indoor Housings, Nov. 28, 2005, 3 pgs.
Dotworkz, STXL-Base Outdoor Housing Assembly with Lid Off Detailing, Oct. 24, 2019, 2 pgs.
PCT/US2021/040172 International Search Report and Written Opinion dated Nov. 2, 2021.

* cited by examiner

ANTI-REFLECTIVE CAMERA HOUSING SYSTEM

CROSS-REFERENCE TO RELATED APPLICATIONS

This application claims priority from and the benefit of U.S. Provisional Application Ser. No. 63/047,095, entitled "ANTI-REFLECTIVE CAMERA HOUSING SYSTEM," filed Jul. 1, 2020, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks may include various entertainment attractions, restaurants, souvenir shops, and rides for providing enjoyment to guests (e.g., families and/or people of all ages) of the amusement park. In some cases, cameras may be utilized in amusement parks to serve any of a variety of functions. For example, still image or video cameras may be incorporated to capture images or videos of guests during an amusement park experience, such as an amusement park ride. Video cameras may also be utilized in amusement parks for surveillance or security purposes, marketing functions, and so forth. In some instances, video cameras may be incorporated with amusement park attractions to provide enhanced features or experiences, such as interactive features and virtual reality (VR) and/or augmented reality (AR) experiences. However, other elements or components commonly utilized in amusement parks and their attractions may affect the operation or functionality of cameras and associated systems. It is now recognized that insulating camera systems from peripheral elements and factors may improve operation of cameras and associated systems within amusement parks.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

The present disclosure also relates to an amusement park attraction installation including a camera disposed on a side of a window, where the camera includes a lens and is configured to capture image data indicative of movement of a guest on an opposite side of the window. The amusement park attraction installation also includes a light source positioned on the side of the window and a camera housing disposed at least partially about the camera, where the camera housing has an inner volume and an opening surrounded by an edge of the camera housing, the lens is disposed within the inner volume, and the edge of the camera housing is in abutment with a surface of the window.

The present disclosure further relates to a camera housing including a plurality of panels defining an inner volume, an opening to the inner volume, and an edge extending about a perimeter of the opening, where a respective surface of each panel of the plurality of panels facing the inner volume has a black shade or color, and the plurality of panels is configured to surround a camera lens disposed within the inner volume. The camera housing also includes a gasket disposed on the edge and extending about the perimeter of the opening. The camera housing is configured to be positioned against a surface of a transparent panel, such that the gasket is disposed against the surface.

The present disclosure further relates to a feature installation of an amusement park attraction including a light source positioned on a first side of a window and a camera positioned on the first side of the window and configured to capture image data of a guest of the amusement park attraction located on a second side of the window opposite the first side. The feature installation further includes a camera housing defining an inner volume and an opening to the inner volume, where the camera is at least partially disposed within the inner volume and is configured to receive the image data via the opening, the camera housing includes a gasket extending about a perimeter of the opening, and the gasket is positioned against a surface of the window on the first side of the window.

Various refinements of the features noted above may be undertaken in relation to various aspects of the present disclosure. Further features may also be incorporated in these various aspects as well. These refinements and additional features may exist individually or in any combination

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
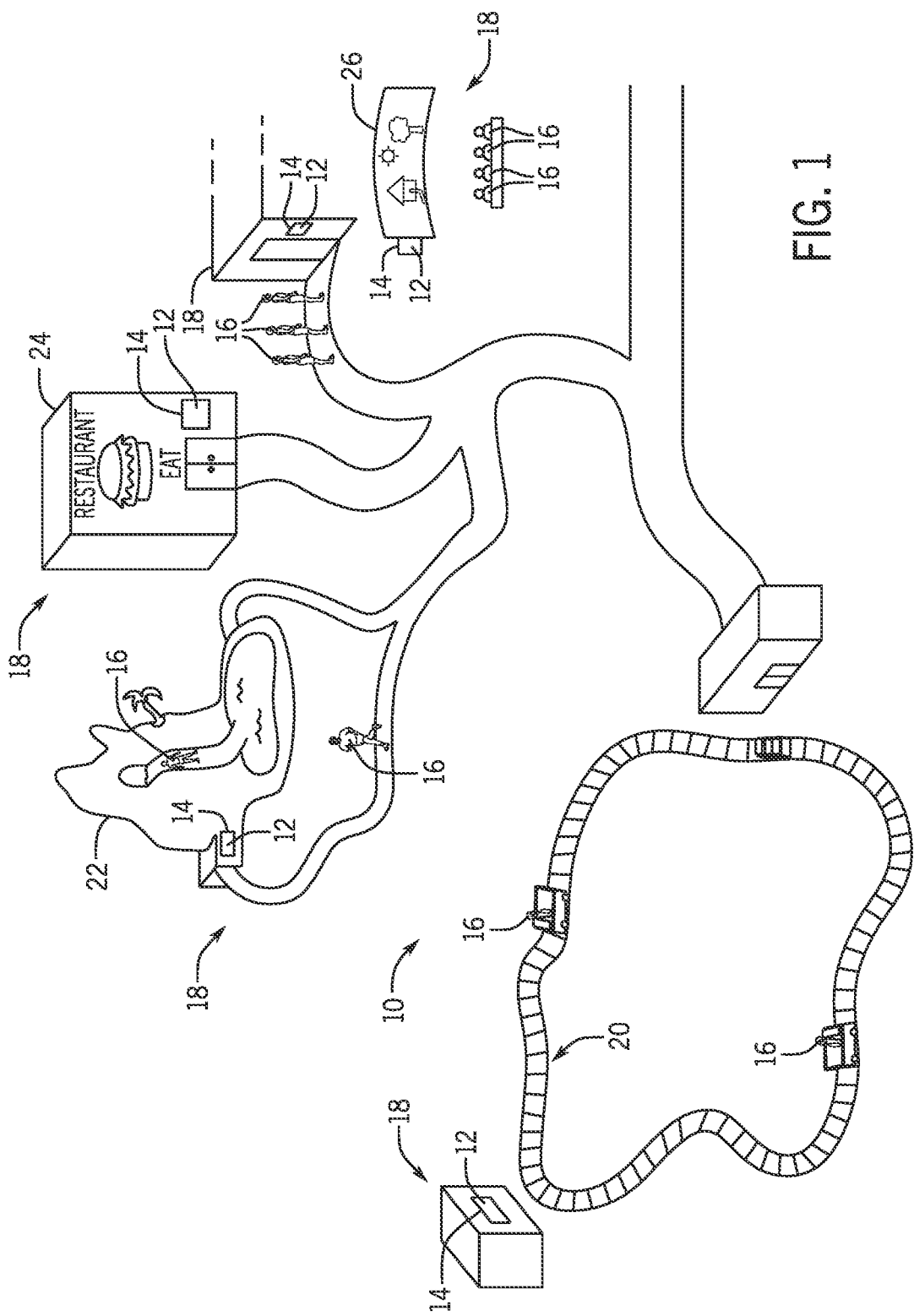
FIG. 1 is a schematic representation of an embodiment of an amusement park having camera systems with anti-reflective camera housings, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Amusement park attractions have become increasingly popular, and various amusement park attractions have been created to provide guests of the amusement park with unique audio and visual experiences. For example, amusement park attractions may include passenger rides (e.g., coasters), games, interactive experiences, educational exhibits, and other activities. A variety of systems may be utilized with amusement park attractions to augment experiences for guests, such as systems related to transportation, lighting, sound, and so forth. In many instances, cameras are utilized within an amusement park to provide guests with enhanced experiences. For example, cameras may capture still images or video of guests during an amusement park attraction experience to provide guests with a souvenir (e.g., a picture or video) of the amusement park experience. In some instances, video cameras may be utilized to track motion of amusement park guests in order to enable additional features of an amusement park experience. For example, camera systems may utilize skeletal tracking techniques to enable interactive attractions, VR/AR experiences, ride simulations, increased guest immersion in the amusement park attraction, and so forth. Unfortunately, external or periphery elements, such as light produced by other elements or sources, may inhibit the functionality of such camera systems during motion or skeletal tracking.

Accordingly, present embodiments are directed to a camera housing system, configured to enhance and improve operation of camera systems that are utilized to track guests in an amusement park. Specifically, the camera housing system may include an anti-reflective housing that enables a camera to capture light from a desired direction or area (e.g., an area in which guests to be tracked are located) while blocking external elements, such as light from adjacent areas, locations, or sources, from interfering with operation of the camera system. The anti-reflective housing includes an inner volume in which a camera or portion of a camera is disposed. The inner volume may be formed by panels that are generally impenetrable to light and thus block light from entering into the inner volume. The anti-reflective housing also includes an opening through which light may enter the inner volume to be captured by the camera. Thus, the anti-reflective housing may be positioned such that the opening faces a desired direction to enable the camera to record or track motion of guests or other moving objects while the panels block light or other elements approaching in other directions from interfering with camera operation. It should be noted that, while the discussion below describes the present techniques utilized in an amusement park context, the disclosed techniques may also be utilized in other contexts, such as restaurants, retail businesses, sport complexes, and so forth. Additionally, the disclosed techniques may be utilized with other types of sensors instead of or in addition to image cameras, such as heat sensors, proximity sensors, radio frequency sensors, and so forth.

With this in mind, FIG. 1 is a schematic representation of an amusement park 10 having camera systems 12 with anti-reflective camera housings 14 configured to enable improved operation of the camera systems 12, such as improved skeletal tracking of guests 16 in the amusement park 10. As illustrated, the amusement park 10 includes a variety of attractions 18, including a ride 20 (e.g., a ride system), a water park 22, a restaurant 24, and a motion simulator 26. The camera system 12 having the anti-reflective camera housing 14 may be utilized with any or all of the attractions 18 in the amusement park 10. For example, the camera system 12 may be utilized to record and/or track motion of guests 16 experiencing one of the attractions 18, and the anti-reflective housing 14 may block extraneous elements, such as light approaching from certain directions, from interfering with operation of the camera system 12.

As mentioned above, motion tracking of the guests 16 may be utilized to provide enhanced features of the attractions 18. For example, the camera system 12 and the anti-reflective housing 14 may be implemented to track motion of guests 16 entering the water park 22, recognize facial expressions and/or gestures of guests 16 ordering from a menu at the restaurant 24, and/or enable VR/AR experiences for guests 16 experiencing the ride 20 or the motion simulator 26. The camera system 12 and anti-reflective camera housing 14 may also be utilized in conjunction with other features or components, such as display screens, lighting features, and other systems which may output elements (e.g., light) that can cause interference with operation of the camera system 12. As discussed in detail below, the anti-reflective camera housing 14 blocks such interference to enable improved operation of the camera system 12 and the attractions 18.

Figure 2:
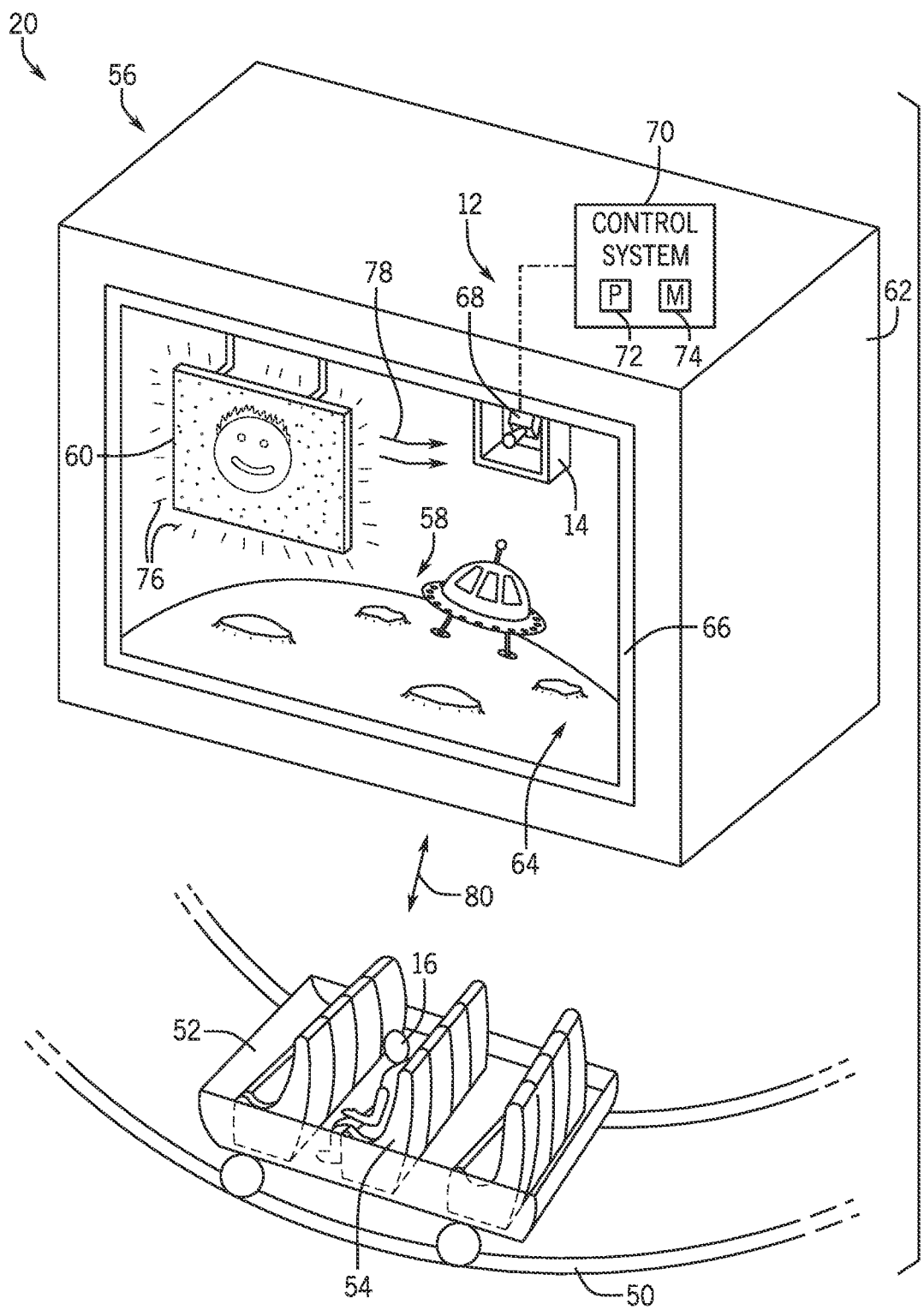
FIG. 2 is a perspective view of an embodiment of a ride system having a camera with an anti-reflective housing, in accordance with an aspect of the present disclosure.

FIG. 2 is a partial perspective view of an embodiment of the ride 20 (e.g., ride system), illustrating an implementation of the camera system 12 and the anti-reflective housing 14 (e.g., housing, camera housing, camera chamber, etc.). The ride 20 includes a ride path 50 (e.g., a track) along which a ride vehicle 52 may travel. Guests 16 positioned within the ride vehicle 52 (e.g., accommodated in a seat 54 of the ride vehicle 20) travel along the ride path 50 to experience one or more environments, sensations, thrills, visual and/or sound presentations, immersive settings, and so forth. For example, the ride path 50 may extend along and past a feature installation 56 of the ride 20, which may be viewable by the guests 16 in the ride vehicle 52.

In the illustrated embodiment, the feature installation 56 includes a scenery and property arrangement 58 and a display screen 60. The scenery and property arrangement 58 may include structures, objects, renderings, or other elements, and the display screen 60 may be configured to present images, videos, or other visual characteristics to the guests 16. The feature installation 56 may be located within a room 62, space, or other area that is separated from the ride path 50 and ride vehicle 52 by a window 64 (e.g., transparent panel or pane) through which guests 16 may view the feature installation 56 while traveling along the ride path 50 in the ride vehicle 52. For example, the window 64 may be formed from glass, polycarbonate, acrylic, or other transparent material and may be at least partially surrounded by a frame 66 (e.g., support structure, casing, etc.).

The camera system 12 is implemented with the ride 20 to capture images and/or video of the guests 16 experiencing the ride 20. As shown, a camera 68 of the camera system 12 is installed within the room 62 on a side of the window 64 with the scenery and property arrangement 58 and the display screen 60. That is, the camera 68, scenery and property arrangement 58, and display screen 60 are positioned on a side of the window 64 that is opposite the ride path 50, ride vehicle 52, and guests 16. In operation, the camera 68 may capture images and/or video of guests 16, which may be utilized for a variety of purposes. For example, the images and/or video of the guests 16 may be utilized to track motion (e.g., skeletal tracking) of the guests 16. In some embodiments, skeletal tracking techniques may enable VR/AR features or experiences for the guests 16 in the ride vehicle 52. To this end, the camera system 12 may further include a control system 70 having a processor 72 (e.g., control circuitry, processing circuitry, etc.) and a memory 74 configured to store instructions executable by the processor 72. The control system 70 may receive input (e.g., data) from the camera 68 and may process the data for use in generating a VR/AR environment for the guests 16. As discussed below, in some embodiments the camera 68 may have a wide angle lens and may be installed in a particular orientation and/or position to enable capture of suitable images and/or video of the guests 16 for any of a variety of purposes.

As the display screen 60 is positioned on a common side of the window 64 with the camera 68, light 76 output by the display screen 60 may reflect off of a surface of the window 64, as indicated by arrows 78, and travel in a direction of the camera 68. It will be appreciated that the light 76 may interfere with operation of the camera 68, which is installed and configured to capture light from a direction 80 of the ride path 50, ride vehicle 52, and guests 16. Such interference may hinder processing of data collected by the camera 68, such as processing for skeletal tracking of the guests 16. Accordingly, the anti-reflective housing 14 is installed with the camera 68 to block interference with the camera 68 caused by external or peripheral elements, such as the light 76. Features and installation of the anti-reflective housing 14 and the camera 68 are discussed in further detail below.

Figure 3:
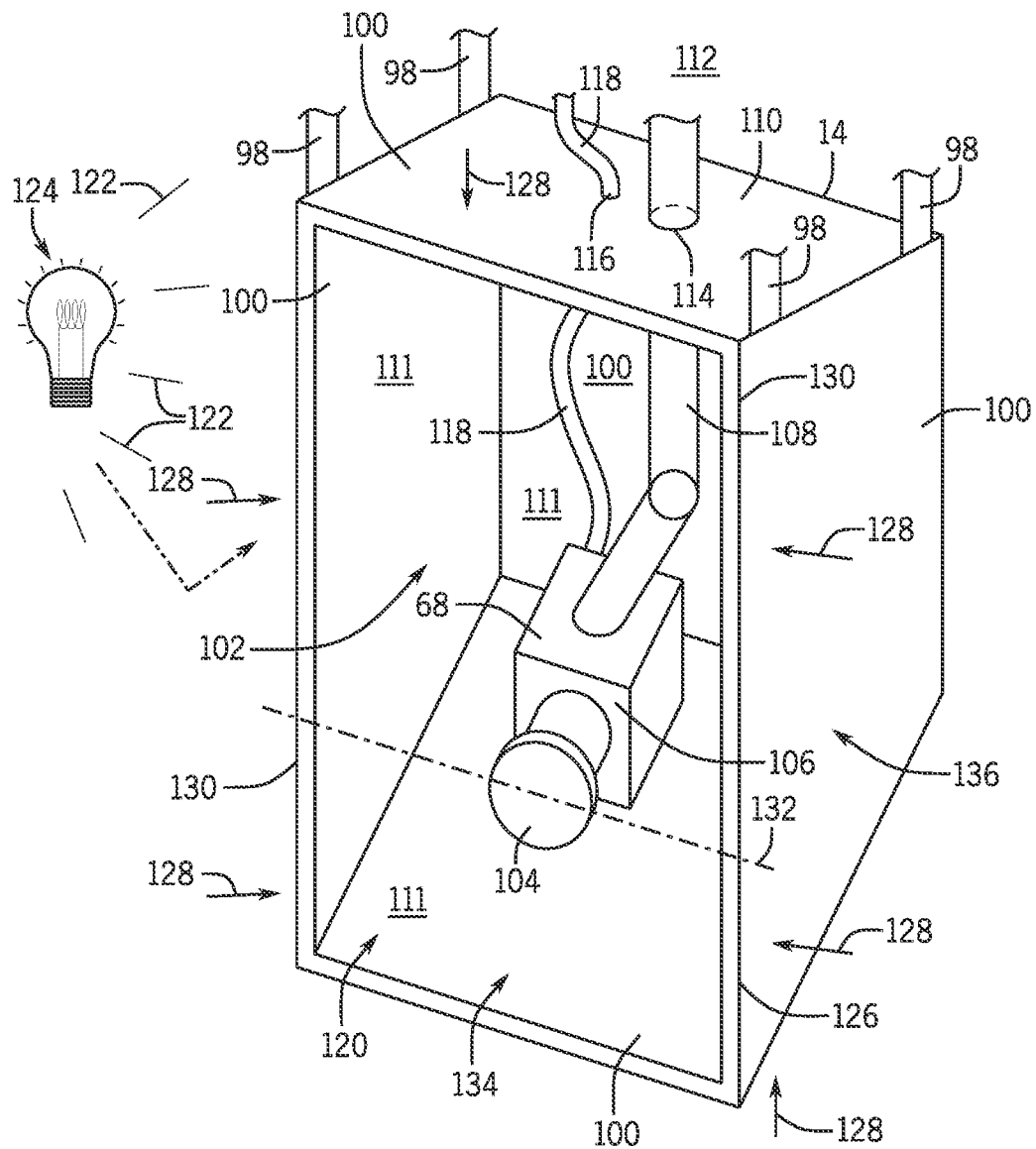
FIG. 3 is a perspective view of an embodiment of a camera and an anti-reflective housing that may be utilized with an amusement park attraction, in accordance with an aspect of the present disclosure.

FIG. 3 is a perspective view of an embodiment of the camera 68 and the anti-reflective housing 14, which may be installed with the feature installation 56. For example, the anti-reflective housing 14 may be secured to one or more support structures 98 that may be further attached to a ceiling or wall of the room 62 or other foundation configured to support the camera 68 and anti-reflective housing 14. The anti-reflective housing 14 includes a plurality of panels 100 that define an inner volume 102 in which the camera 68 is disposed. The panels 100 may be formed from plywood, medium-density fiberboard (MDF), plastic, metal, or other suitable material. In the illustrated embodiment, the camera 68 is fully or completely disposed within the inner volume 102. In other embodiments, a portion of the camera 68 (e.g., a lens 104, such as a wide-angle lens, a portion of a body 106 of the camera 68, etc.) may be positioned within the inner volume 102, and a remaining portion of the camera 68 may be disposed external to the inner volume 102 and the anti-reflective housing 14.

The camera 68 is suspended within the inner volume 102 by an articulating arm 108 that extends from the camera 68, through the inner volume 102, and through one of the panels 100 (e.g., a top panel 110) to an exterior 112 of the anti-reflective housing 14. To this end, the top panel 110 includes an aperture or hole 114 through which the articulating arm 108 may extend. The top panel 110 may also include an additional aperture or hole 116 through which a conduit 118 (e.g., data cable) may extend from the camera 68 and the inner volume 102 to the exterior 112 of the anti-reflective housing 14 to enable transmission of data captured by the camera 68 to the control system 70. However, in other embodiments, the articulating arm 108 and the conduit 118 may extend from the inner volume 102 to the exterior 112 via a common aperture (e.g., the conduit 118 may be routed through an interior passage formed in the articulating arm 108). Further, while the illustrated embodiment shows the articulating arm 108 and the conduit 118 extending through the top panel 110, in other embodiments in which the camera 68 is fully contained within the anti-reflective housing 14, the articulating arm 108 and conduit 118 may extend through any of the panels 100 (e.g., the same panel, different panels, a rear panel, a side panel, etc.).

As mentioned above, the anti-reflective housing 14 is configured to enable capture of images and/or video of the guests 16 or other subjects of interest while blocking interference from peripheral or extraneous elements, such as light output by an adjacent component installed within the feature installation 56. Accordingly, in addition to the inner volume 102, the plurality of panels 100 defines an opening 120 through which light may be captured from a direction of the guests 16 or other subjects of interest. In an installed configuration, the anti-reflective housing 14 and the camera 68 disposed within the inner volume 102 are arranged such that the opening 120 and the lens 104 of the camera 68 are generally exposed to (e.g., facing) a direction or area in which the guests 16 and/or other subjects of interest are expected to be located. In this way, the camera 68 may capture light (e.g., images and/or video) from the direction of the guests 16, and the anti-reflective housing 14 (e.g., the panels 100) may block light traveling in other directions from being detected by the camera 68. To reduce undesired reflection of light within the inner volume 102 that is received via the opening 120, surfaces 111 of the panels 100 facing the inner volume 102 may be coated (e.g., painted) or otherwise formed with a dark shaded or colored layer, such as a matte black layer or a flat black layer. As will be appreciated, matte or flat black surfaces may more readily absorb light, thereby reducing reflections of light within the inner volume 102, which may interfere with operation of the camera 68 and/or manipulation and analysis of the data collected by the camera 68.

As previously discussed, the anti-reflective housing 14 and the camera 68 may be positioned on a side of the window 64 or other transparent panel opposite a side on which the guests 16 are located. In order to reduce transmission of light 122 generated by a light source 124 disposed on the same side of the window 64 (e.g., the display screen 60) via reflection of the light 122 off the window 64 towards the camera 68, the anti-reflective housing 14 may be positioned in abutment with the window 64. For example, a front face or edge 126 of the anti-reflective housing 14, which generally defines a perimeter of the opening 120, may be disposed or biased against the window 64. In this way, the plurality of panels 100 may block transmission of light 122 into the inner volume 102 from lateral sides of the anti-reflective housing 14, as represented by arrows 128. Instead, light from the direction of the guests 16 may travel through the window 64 and into the inner volume 102 of the anti-reflective housing 14 (i.e., via the opening 120) for detection by the camera 68 without interference from the light 122 generated by the light source 124 adjacent to the anti-reflective housing 14.

In some embodiments, the anti-reflective housing 14 may include a gasket 130 disposed along the front edge 126 of the anti-reflective housing 14. When the anti-reflective housing 14 is in the installed configuration, the gasket 130 may be disposed or biased against a surface of the window 64 or other transparent panel to create a seal through which light may not travel (e.g., into the inner volume 102 via reflection off the window 64). For example, the gasket 130 may be formed from foam, rubber, silicone, felt, a polymeric material, or other suitable material. In some embodiments, the material of the gasket 130 may be configured to withstand and/or absorb a compressive load to enable a light-blocking engagement between the surface of the window 64 and the anti-reflective housing 14.

Furthermore, in an installed configuration, the anti-reflective housing 14 and the camera 68 may be positioned against the window 64 adjacent to the frame 66 of the window 64 and/or adjacent to a layer of material applied to the window 64 (e.g., a decal, sticker, applied graphics, opaque material, or other substrate) through which light may not travel. In such embodiments, the anti-reflective housing 14 and the camera 68 are positioned such that the camera 68 is adjacent an edge of the layer, represented by dashed line 132 in FIG. 3. As a result, a bottom portion 134 of the anti-reflective housing 14 including the camera 68 may receive light into the inner volume 102 through the opening 120 and may therefore be visible to guests 16. A top portion 136 of the anti-reflective housing 14, however, may be blocked from view by the guests 16 by the layer or other substrate applied to the window 64. In this way, visibility of the anti-reflective housing 14 and the camera 68 is limited to provide improved aesthetics, while still enabling operation of the camera system 12 to monitor and/or track movement of the guests 16.

Figure 4:
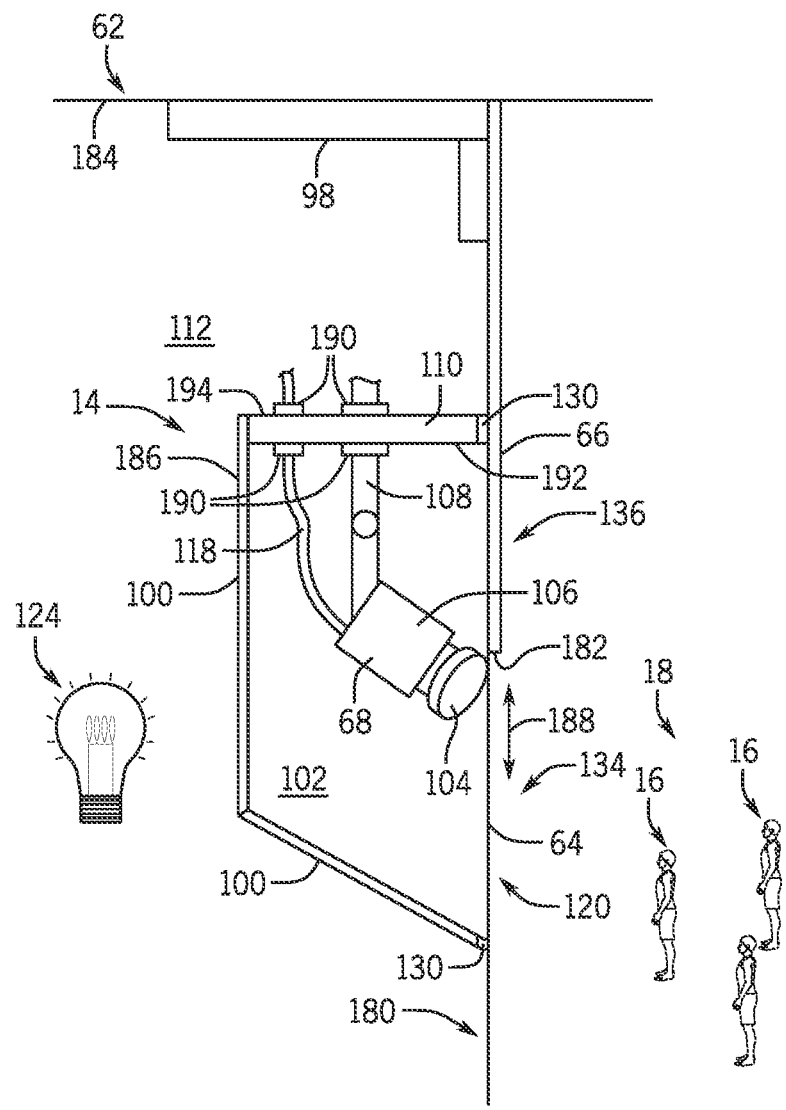
FIG. 4 is a cross-sectional side view of an embodiment of a camera and an anti-reflective housing that may be utilized with an amusement park attraction, in accordance with an aspect of the present disclosure.

FIG. 4 is a cross-sectional side view of an embodiment of the anti-reflective housing 14 and the camera 68 in an installed configuration. Specifically, the anti-reflective housing 14 is positioned against the window 64, such that the gasket 130 is in abutment with a surface 180 of the window 64. Additionally, as described above, the camera 68 is positioned within the inner volume 102 of the anti-reflective housing 14 such that the camera 68 (e.g., the lens 104) is adjacent an edge 182 of the frame 66 of the window 64. Thus, the frame 66 shields the top portion 136 of the anti-reflective housing 14 from view through the window 64 (e.g., by the guests 16). However, in other embodiments, the edge 182 may be an edge of a decal, sticker, graphic, or other opaque layer applied to the window 64. In this configuration, the lens 104 may detect light received through the window 64, while visibility of the top portion 136 of the anti-reflective housing 14, including the articulating arm 108 and the conduit 118, is reduced.

In the illustrated embodiment, the support structure 98 of the anti-reflective housing 14 is secured to a ceiling 184 of the room 62 or area in which the anti-reflective housing 14 and camera 68 are installed. However, in other embodiments, the support structure 98 may be secured to another foundation or base, such as an external frame, a pedestal, a wall, or other suitable structure configured to support the anti-reflective housing 14 and the camera 68.

As will be appreciated, adjustments and/or modifications to the camera 68 or other components of the camera system 12 may be desirable, such as for maintenance, calibration, replacement, and so forth. To this end, one or more of the plurality of panels 100 may be removable (e.g., via mechanical fasteners, adhesives, etc.) to enable access to the camera 68, the articulating arm 108, the conduit 118, and other components contained within the anti-reflective housing 14. For example, a rear panel 186 of the plurality of panels 100 may be removable to enable access to the inner volume 102 and the components therein. In some embodiments, the window 64 may be configured to retract, slide, or otherwise translate relative to the installed anti-reflective housing 14 (e.g., as indicated by arrow 188). The gasket 130 positioned against the surface 180 of the window 64 may be formed from a material configured to facilitate relative movement between the window 64 and the anti-reflective housing 14. In some instances, the window 64 may be actuated to retract or move to enable access to the inner volume 102 and the components disposed therein via the opening 120.

The illustrated embodiment also depicts an arrangement of the articulating arm 108 and the conduit 118 extending through the top panel 110 of the anti-reflective housing 14. Specifically, grommets 190 (e.g., rings, seals, eyelets, etc.) are positioned about the articulating arm 108 and the conduit 118 adjacent to the top panel 110 (e.g., adjacent an inner surface 192 and adjacent an outer surface 194 of the top panel 110) to facilitate securement of the articulating arm 108 and the conduit 118 relative to the top panel 110 and to further block undesirable transmission of light (e.g., from the light source 124) into the inner volume 102). However, additional and/or alternative components may be utilized to secure the articulating arm 108 and the conduit 118 in place and/or to block undesirable light transmission, such as bushings, nuts, foam sealant, adhesives, etc.

Figure 5:
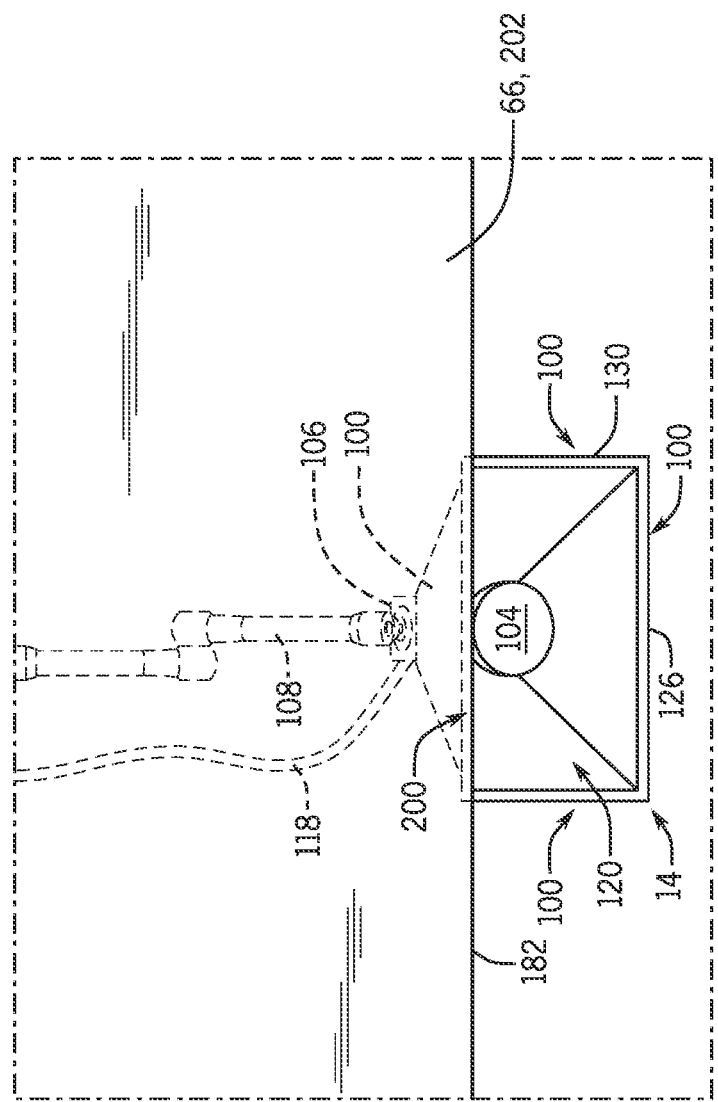
FIG. 5 is a front view of an embodiment of a camera and an anti-reflective housing that may be utilized with an amusement park attraction, in accordance with an aspect of the present disclosure.

FIG. 5 is a front view of an embodiment of the anti-reflective housing 14 and the camera 68 in an installed configuration. In the illustrated embodiment, the anti-reflective housing 14 encloses a portion of the camera 68. Specifically, the lens 104 and a portion of the body 106 of the camera 68 are disposed within the inner volume 102 of the anti-reflective housing 14, while a remaining portion of the body 106 is external to the anti-reflective housing 14. The articulating arm 108 and the conduit 118 extending from the body 106 of the camera 68 are also external to the anti-reflective housing 14. The articulating arm 108 may be secured to the support structure 98 or other base or foundation to enable securement of the camera 68 and anti-reflective housing 14 in a desired position.

The anti-reflective housing 14 is formed from the plurality of panels 100 in a generally pyramidal configuration. The plurality of panels 100 forms the opening 120 to enable transmission of light through the window 64 and into the inner volume 102 for detection by the camera 68. Additionally, as described above, the opening 120 is defined by the front edge 126 having the gasket 130, which is biased or positioned against the window 64 to block transmission of light into the inner volume 102 from light sources on the same side of the window 64 as the anti-reflective housing 14 and the camera 68, such as via reflection of the light off of the window 64.

Furthermore, in the illustrated embodiment, the anti-reflective housing 14 is positioned such that a top edge 200 of the opening 120 is adjacent to (e.g., aligned with) the edge 182 of the frame 66 and/or opaque layer 202 (e.g., decal) applied to the window 64. The lens 104 of the camera 68 is positioned beneath the top edge 200 of the opening 120 and therefore may detect light passing through the window 64. However, the frame 66 or opaque layer 202 blocks visibility of the articulating arm 108, conduit 118, and portions of the anti-reflective housing 14 from the perspective of the guests 16, thereby improving aesthetics of the attraction 18 (e.g., the ride 20) having the camera system 12.

Enclosure of a portion of the camera 68, instead of the entire camera 68, with the anti-reflective housing 14 may provide increased accessibility to the camera 68, such as for maintenance, calibration, operational adjustment, and so forth. Exposure of portions of the camera 68 to an environment surrounding the anti-reflective housing 14 may also enable increased cooling of the camera 68 during operation. Additionally, as the articulating arm 108 is not contained within the anti-reflective housing 14, adjustments to the position of the camera 68 and the anti-reflective housing 14 (e.g., relative to the window 64) via manipulation of the articulating arm 108 may be readily achieved.

In the illustrated embodiment, the panels 100 forming the anti-reflective housing 14 are arranged such that the opening 120 has a rectangular shape or profile. It will be appreciated that the geometry, shape, configuration, and/or dimensions of the opening 120 may be selected based on any suitable factors, such as a distance from the opening 120 to the area in which guests 16 to be monitored or tracked are expected, a type of the lens 104 (e.g., a wide-angle lens), a size of the area in which guests 16 to be monitored or tracked are expected, operational limits of the camera 68, and/or other parameters of the camera system 12 and/or attraction 18 with which the camera system 12 is utilized.

Figure 6:
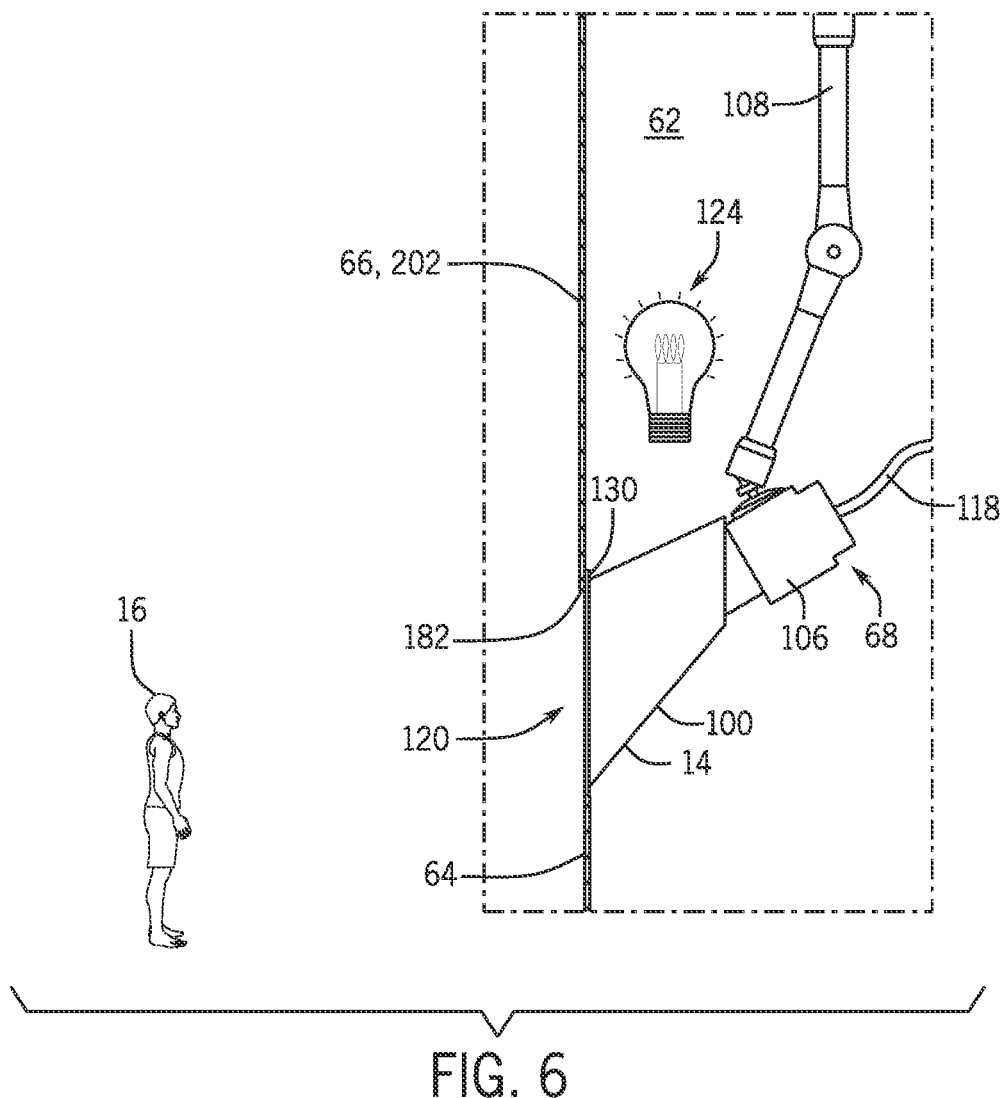
FIG. 6 is a side view of an embodiment of a camera and an anti-reflective housing that may be utilized with an amusement park attraction, in accordance with an aspect of the present disclosure.

FIG. 6 is a side view of an embodiment of the anti-reflective housing 14 and the camera 68 in an installed configuration, in which a portion of the camera 68 is disposed within the inner volume 102 of the anti-reflective housing 14, and a remaining portion of the camera 68 is disposed external to the anti-reflective housing 14. The articulating arm 108 and the conduit 118 are also external to the anti-reflective housing 14. Thus, the articulating arm 108, the conduit 118, and portions of the camera 68 are readily accessible for adjustment or manipulation by a user or operator (e.g., within the room 62).

As shown, panels 100 of the anti-reflective housing 14 may be secured to the camera 68, such as to the body 106 of the camera 68. The panels 100 may be coupled to the camera 68 to create a seal that blocks transmission of light (e.g., generated by light source 124) into the inner volume 102. For example, gaskets, sealants, adhesives, or other suitable materials may be utilized to secure the panels 100 to the camera 68.

It should be appreciated that the techniques and embodiments presently disclosed may be implemented with any of a variety of modifications. For example, the anti-reflective housing 14 may include additional or alternative features, configurations, modifications, etc. than those explicitly illustrated and described herein. In some embodiments, the anti-reflective housing 14 may be sized and configured to contain multiple cameras 68, such as cameras 68 of different types, in a single housing. The camera 68 may be mounted within the anti-reflective housing 14 using other features instead of the articulating arm 108, such as brackets, braces, and so forth. In any case, the anti-reflective housing 14 is configured to enable capture of light via the camera 68 from a target area (e.g., having the guests 16) while blocking transmission of light toward the camera 68 from undesirable sources, such as the light source 124 disposed on the same side of the window 64 as the camera 68 and the anti-reflective housing 14. In this way, the anti-reflective housing 14 enables monitoring and tracking of the guests 16, as well as implementation of the camera system 12 with various attractions 18 that also incorporate other features that produce light (e.g., the display screen 60) that otherwise may interfere with operation of the camera system 12.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. An amusement park attraction installation, comprising:
   a camera disposed on a side of a window, wherein the camera comprises a lens and is configured to capture image data indicative of movement of a guest on an opposite side of the window;
   a light source positioned on the side of the window, wherein the light source is configured to output a visual effect through the window for viewing by the guest; and
   a camera housing disposed at least partially about the camera, wherein the camera housing comprises an inner volume and an opening to the inner volume surrounded by an edge of the camera housing, wherein the lens is disposed within the inner volume, and the edge of the camera housing is in abutment with a surface of the window.

2. The amusement park attraction installation of claim 1, wherein the camera housing comprises a plurality of panels that define the inner volume and the opening, and wherein a respective surface of each panel of the plurality of panels facing the inner volume comprises a black shade or color.

3. The amusement park attraction installation of claim 2, wherein the black shade or color is a matte black shade or color or a flat black shade or color.

4. The amusement park attraction installation of claim 2, comprising an articulating arm coupled to the camera and configured to suspend the camera within the inner volume, wherein a body of the camera is completely disposed within the inner volume, and wherein the articulating arm is partially disposed within the inner volume.

5. The amusement park attraction installation of claim 4, wherein the articulating arm extends through a panel of the plurality of panels to an exterior of the camera housing.

6. The amusement park attraction installation of claim 1, wherein the edge of the camera housing comprises a gasket in abutment with the surface of the window.

7. The amusement park attraction installation of claim 6, wherein the gasket is formed from a compressive material, and the compressive material comprises foam, rubber, neoprene, a polymeric material, or any combination thereof.

8. The amusement park attraction installation of claim 1, wherein the light source is a display screen.

9. The amusement park attraction installation of claim 1, comprising a camera system including the camera, wherein the camera system comprises processing circuitry and one or more tangible, non-transitory, computer-readable media that store instructions executable by the processing circuitry, wherein the instructions, when executed, cause the processing circuitry to track motion of the guest based on the image data using skeletal tracking.

10. The amusement park attraction installation of claim 1, wherein a portion of the camera is disposed within the inner volume, and a remaining portion of the camera is disposed external to the inner volume.

11. A camera system, comprising:
a camera comprising a camera lens, wherein the camera is configured to capture image data indicative of movement of an amusement park guest;
a camera housing, comprising:
a plurality of panels defining an inner volume, an opening to the inner volume, and an edge extending about a perimeter of the opening, wherein a respective surface of each panel of the plurality of panels facing the inner volume comprises a black shade or color, and wherein the plurality of panels is configured to surround the camera lens disposed within the inner volume; and
a gasket disposed on the edge and extending about the perimeter of the opening,
wherein the camera housing is configured to be positioned against a surface of a transparent panel, such that the gasket is disposed against the surface;
processing circuitry; and
one or more tangible, non-transitory, computer-readable media storing instructions executable by the processing circuitry, wherein the instructions, when executed, cause the processing circuitry to track motion of the amusement park guest using skeletal tracking based on the image data.

12. The camera system of claim 11, wherein the plurality of panels is configured to contain the camera having the camera lens disposed within the inner volume.

13. The camera system of claim 11, wherein a panel of the plurality of panels is removably coupled to remaining panels of the plurality of panels.

14. The camera system of claim 11, wherein the gasket comprises foam, felt, rubber, neoprene, a polymeric material, or any combination thereof.

15. The camera system of claim 11, wherein the camera housing is configured to couple to the camera having the camera lens, such that a portion of the camera including the camera lens is disposed within the inner volume, and a remaining portion of the camera is disposed external to the inner volume.

16. The camera system of claim 11, wherein the black shade or color is a matte black shade or color or a flat black shade or color.

17. A feature installation of an amusement park attraction, the feature installation comprising:
a light source positioned on a first side of a window;
a camera system, comprising:
a camera positioned on the first side of the window and configured to capture image data of a guest of the amusement park attraction located on a second side of the window opposite the first side; and
a control system configured to perform skeletal tracking of the guest based on the image data; and
a camera housing defining an inner volume and an opening to the inner volume, wherein the camera is at least partially disposed within the inner volume and is configured to receive the image data via the opening, the camera housing comprises a gasket extending about a perimeter of the opening, and the gasket is positioned against a surface of the window on the first side of the window.

18. The feature installation of claim 17, comprising an opaque substrate applied to an additional surface of the window on the second side of the window, wherein the opaque substrate overlaps with the opening of the camera housing.

19. The feature installation of claim 17, wherein the camera housing comprises a plurality of panels defining the inner volume and the opening, wherein each panel of the plurality of panels comprises a surface facing the inner volume, and the surface comprises a matte black shade or color or a flat black shade or color.

20. The feature installation of claim 17, wherein the camera comprises a wide-angle lens.

* * * * *